(12) United States Patent
Johnson et al.

(10) Patent No.: US 7,708,506 B2
(45) Date of Patent: May 4, 2010

(54) SELF-SYNCHRONIZING TAP DRIVER FOR RIGID TAPPING WITH STARTING FORCE ADJUSTMENT

(75) Inventors: Allan S. Johnson, Harrison, ID (US); Mark F. Johnson, Harrison, ID (US)

(73) Assignee: The Tapmatic Corporation, Post Falls, ID (US)

( * ) Notice: Subject to any disclaimer, the term of this patent is extended or adjusted under 35 U.S.C. 154(b) by 541 days.

(21) Appl. No.: 11/155,524

(22) Filed: Jun. 16, 2005

(65) Prior Publication Data

US 2006/0285933 A1    Dec. 21, 2006

(51) Int. Cl.
*B23B 31/02*    (2006.01)

(52) U.S. Cl. .................. 408/238; 470/96; 470/103; 408/239 R

(58) Field of Classification Search .......... 408/139, 408/141, 142, 127, 238, 239 A, 239 R, 156; 470/183, 198, 207, 96, 103; 279/16; *B23G 1/44, B23G 1/46*
See application file for complete search history.

(56) References Cited

U.S. PATENT DOCUMENTS

| | | | | | |
|---|---|---|---|---|---|
| 195,181 | A | * | 9/1877 | Strohm | ...................... 15/104.16 |
| 1,763,717 | A | | 6/1930 | Morgan | |
| 2,371,330 | A | | 3/1945 | Irstad | |
| 2,722,812 | A | * | 11/1955 | Golasky | ...................... 464/112 |
| 2,761,298 | A | * | 9/1956 | Jarvis | ........................... 464/88 |
| 2,941,414 | A | * | 6/1960 | Lee | ............................... 74/378 |
| 3,002,206 | A | * | 10/1961 | Johnson | ....................... 408/139 |
| 3,178,739 | A | * | 4/1965 | Plummer et al. | ............ 408/141 |
| 3,787,136 | A | * | 1/1974 | Steiner | ....................... 408/139 |
| 3,821,826 | A | | 7/1974 | Khachigian | |
| 4,014,622 | A | | 3/1977 | Lotz | |
| 4,028,763 | A | | 6/1977 | Jenner | |
| 4,029,429 | A | * | 6/1977 | Johnson | ...................... 408/142 |
| 4,072,084 | A | | 2/1978 | Knight, Jr. et al. | |
| 4,080,090 | A | | 3/1978 | Kern | |
| 4,123,192 | A | * | 10/1978 | Ruland | ....................... 408/133 |
| 4,274,768 | A | | 6/1981 | Kato | |
| 4,277,209 | A | * | 7/1981 | Benjamin et al. | ........... 408/139 |
| 4,284,374 | A | | 8/1981 | Senzaki | |
| 4,364,694 | A | * | 12/1982 | Miles | ......................... 408/139 |
| 4,449,868 | A | | 5/1984 | Steinberger et al. | |
| 4,514,115 | A | | 4/1985 | Akashi | |
| 4,531,865 | A | * | 7/1985 | Johnson | ...................... 408/139 |
| 4,705,437 | A | * | 11/1987 | Johnson | ...................... 408/139 |
| 4,722,643 | A | * | 2/1988 | Johnson | ...................... 408/142 |
| 4,832,542 | A | * | 5/1989 | Johnson et al. | ............. 408/139 |

(Continued)

FOREIGN PATENT DOCUMENTS

DE    3727103 A1 *  2/1989

(Continued)

*Primary Examiner*—Daniel W Howell
(74) *Attorney, Agent, or Firm*—Wells St. John, P.S.

(57) ABSTRACT

Disclosed is a tap driver for rigid tapping, which includes predetermined tension and compression factors to self-synchronize the tap driver. In the preferred embodiment, the tap driver includes helical coils imparted in the tap driver body which allow the attachment body to synchronize axially in response to a force of a predetermined magnitude imparted on the tap. An additional embodiment of this invention provides such a tap driver body wherein the body allows for lateral flexure and movement to compensate for feed error and location error.

10 Claims, 8 Drawing Sheets

U.S. PATENT DOCUMENTS

| | | | |
|---|---|---|---|
| 5,054,974 A | | 10/1991 | Wellach |
| 5,203,651 A | * | 4/1993 | Johnson ................. 408/59 |
| 5,209,616 A | * | 5/1993 | Johnson ................ 408/139 |
| 5,263,799 A | * | 11/1993 | Blessing ............... 408/139 |
| 5,358,362 A | * | 10/1994 | Johnson ................ 408/139 |
| 5,628,593 A | * | 5/1997 | Johnson ................ 408/139 |
| 5,865,575 A | * | 2/1999 | Johnson ................ 408/139 |
| 5,882,015 A | | 3/1999 | McPherson |
| 5,915,892 A | | 6/1999 | Glimpel et al. |
| 6,257,809 B1 | | 7/2001 | Silken |
| 6,348,003 B1 | | 2/2002 | Johnson et al. |
| 6,569,022 B2 | | 5/2003 | Johnson et al. |

FOREIGN PATENT DOCUMENTS

| | | | |
|---|---|---|---|
| DE | 43 07 497 A1 | | 10/1993 |
| EP | 181625 A2 | * | 5/1986 |
| EP | 0 614 020 A1 | | 5/1993 |
| EP | 1839786 A1 | * | 10/2007 |
| JP | 06031511 A | * | 2/1994 |
| SU | 837581 B | * | 6/1981 |
| SU | 904904 B | * | 2/1982 |
| SU | 1281347 A1 | * | 1/1987 |

* cited by examiner

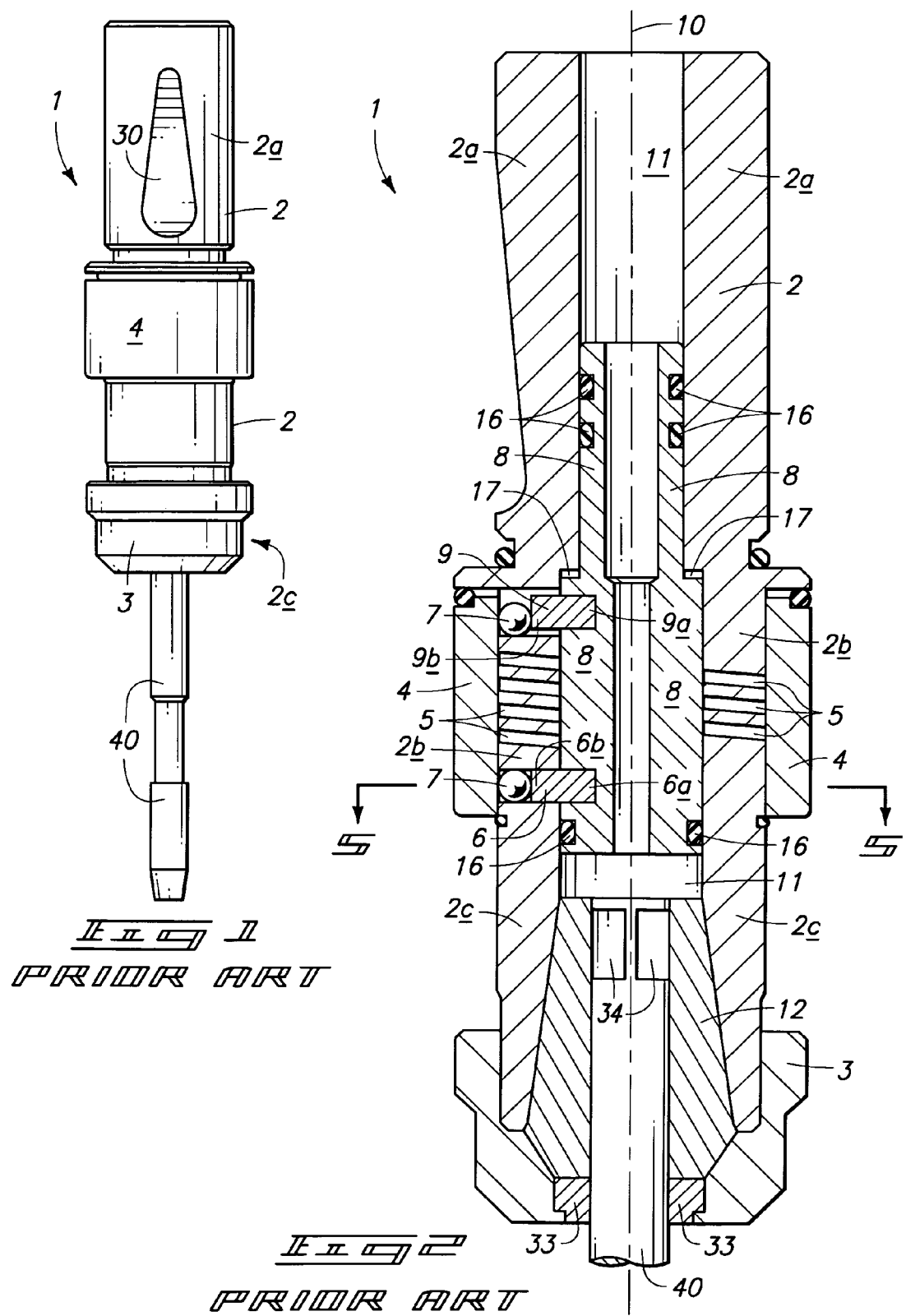

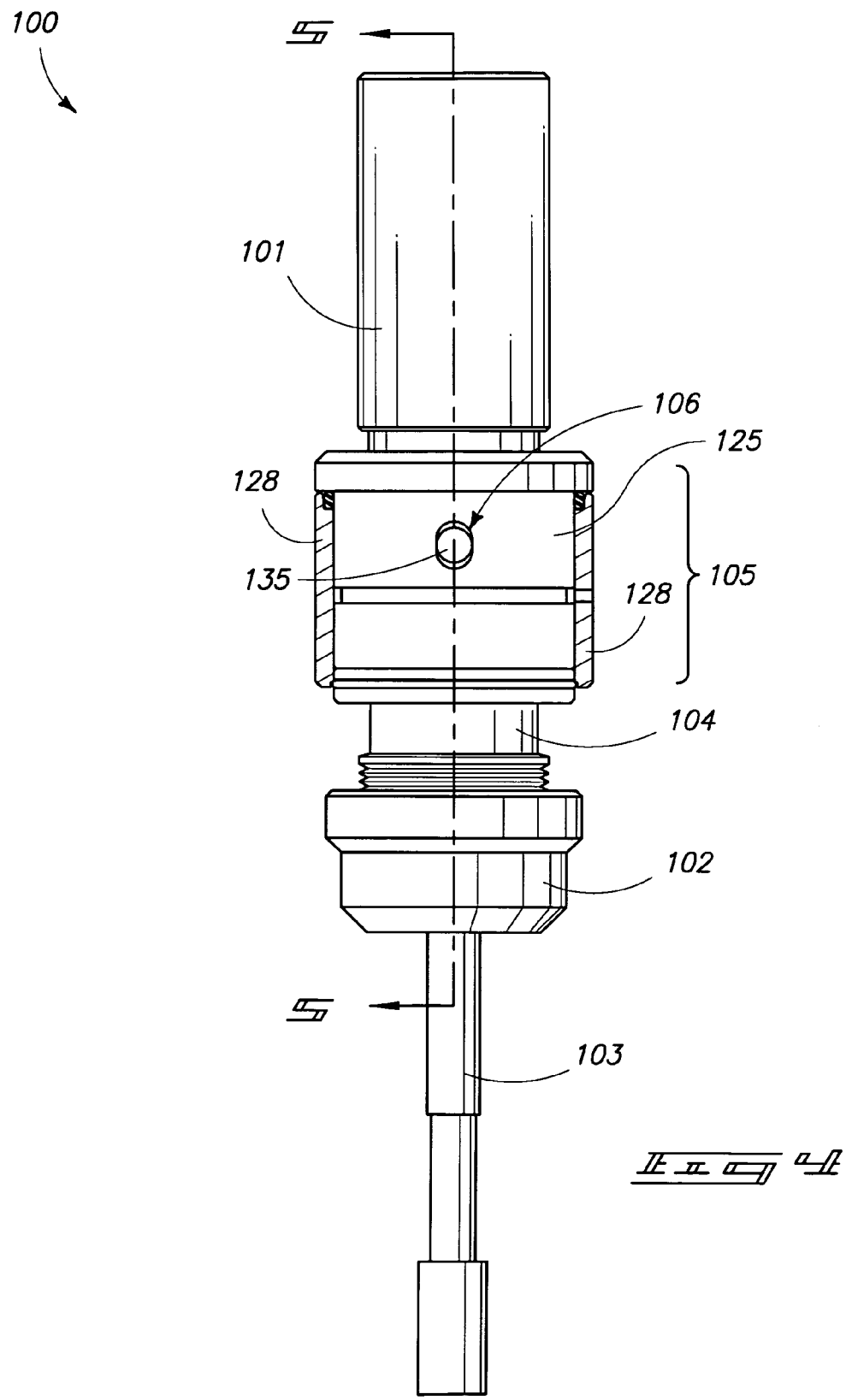

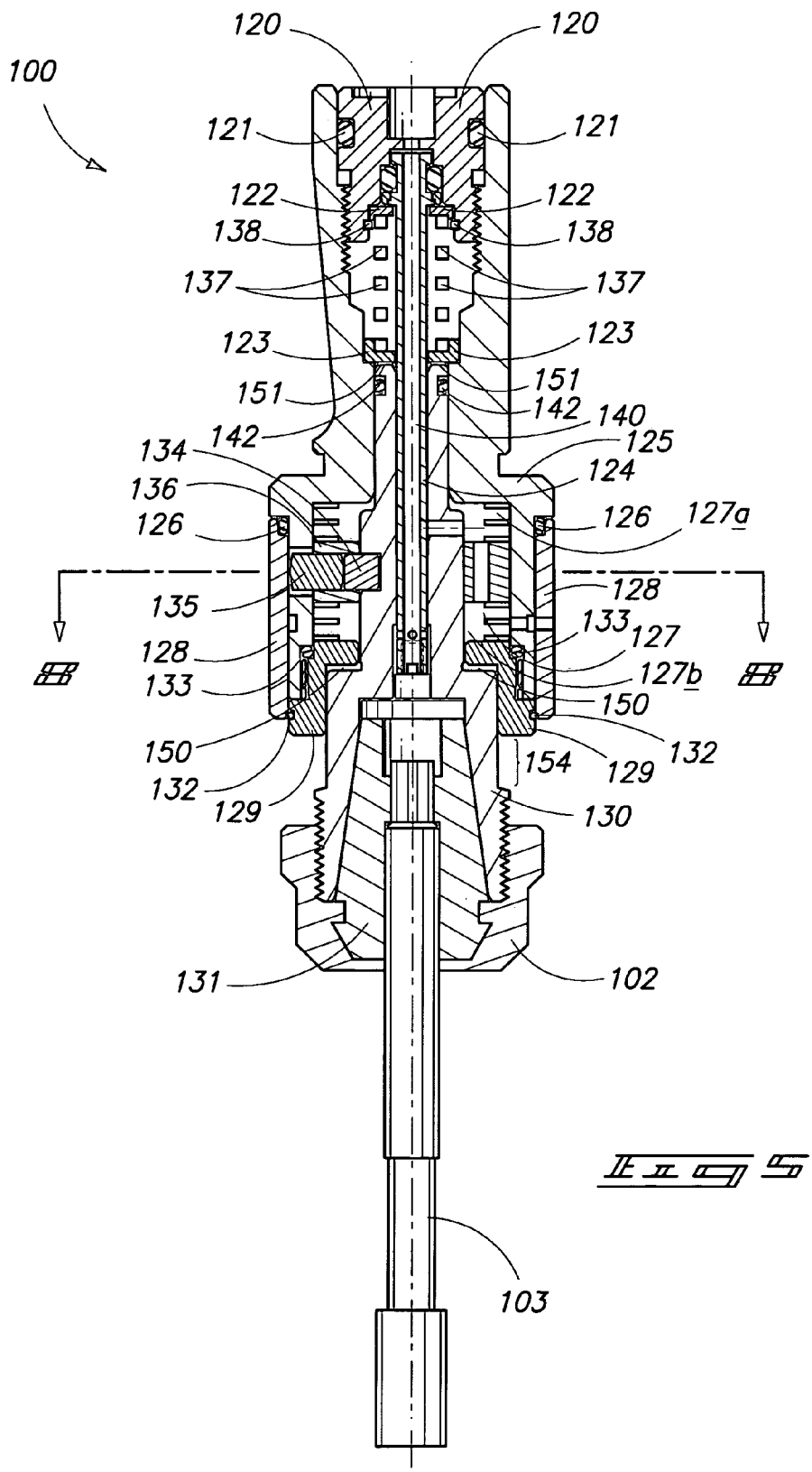

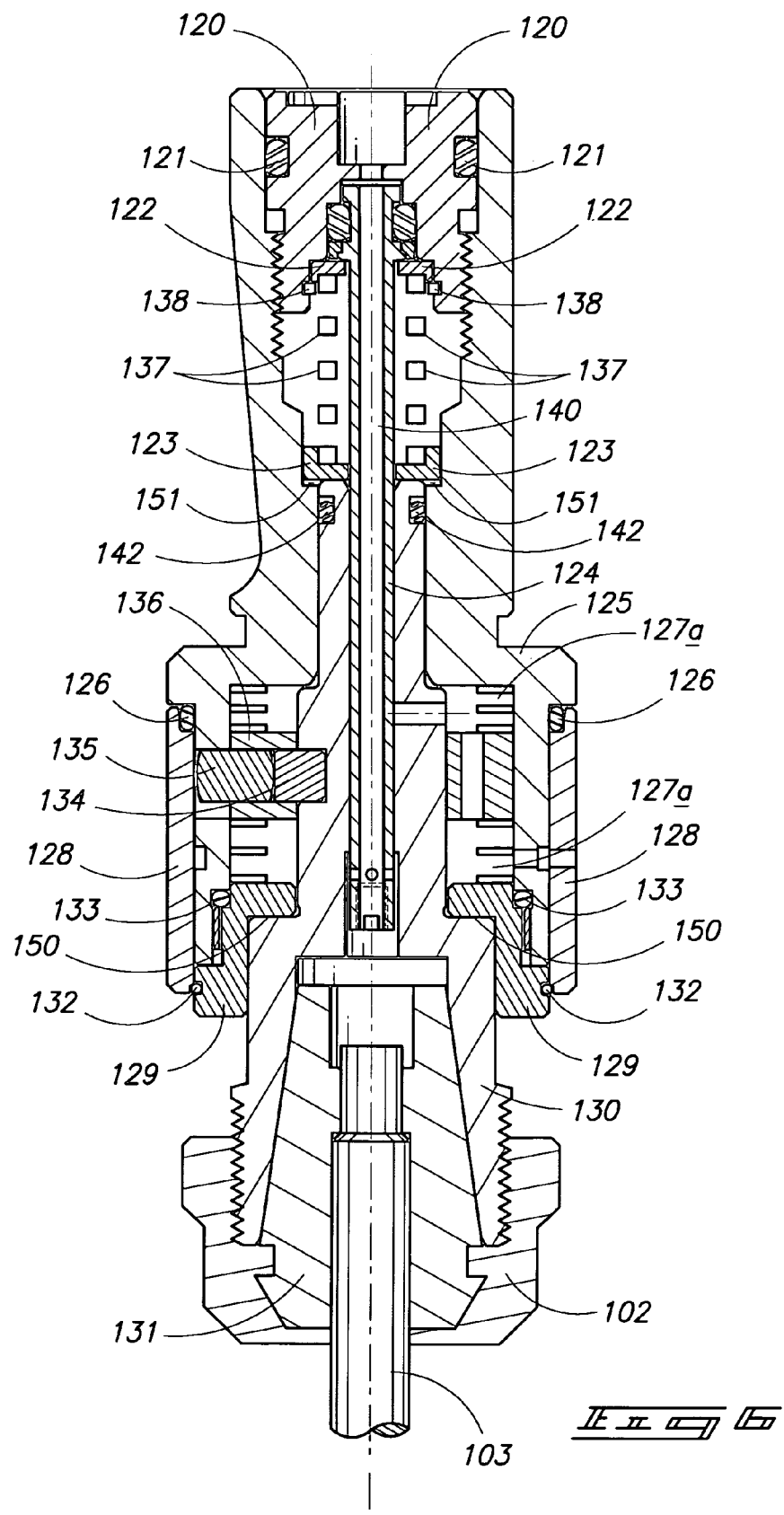

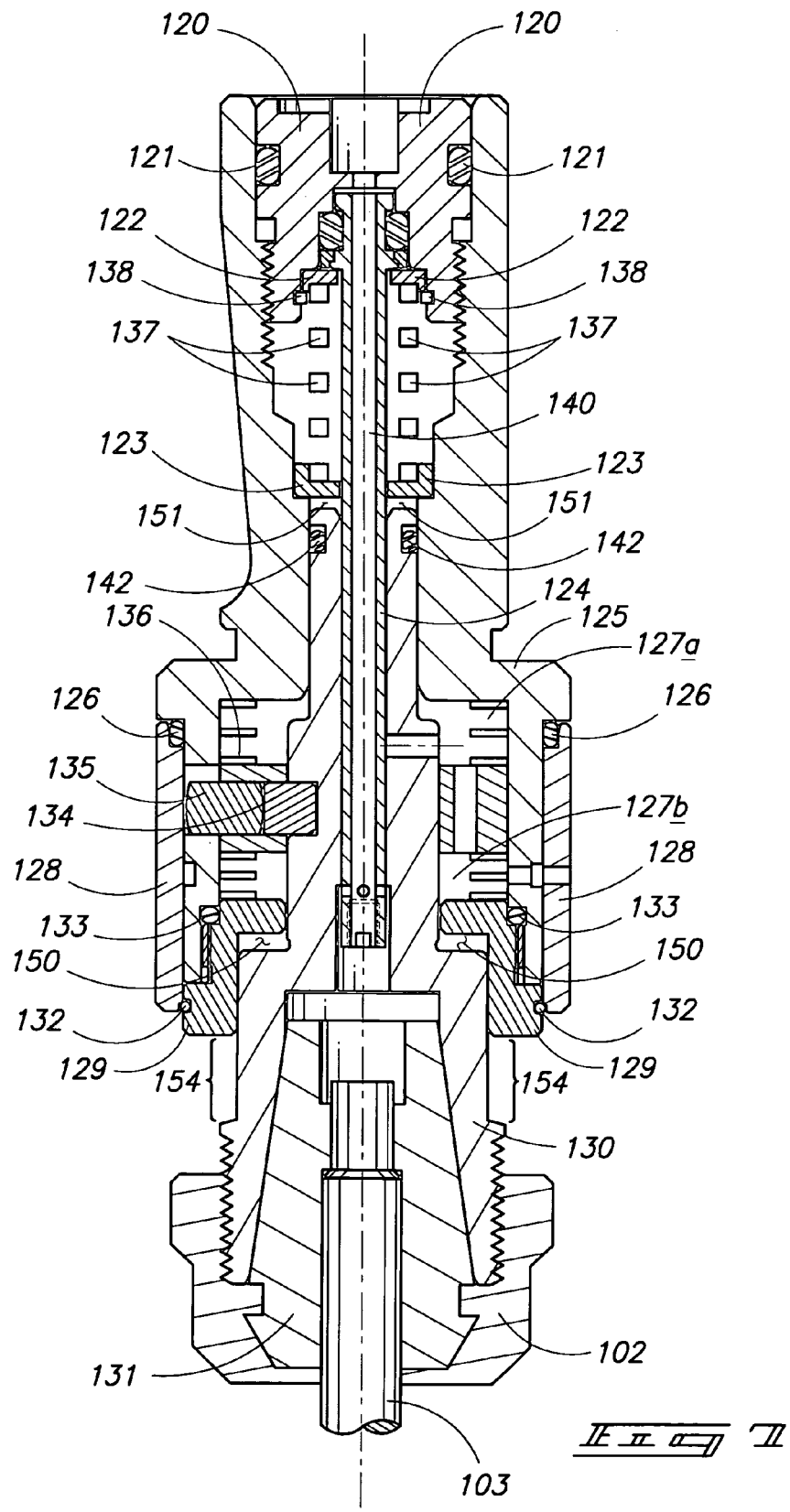

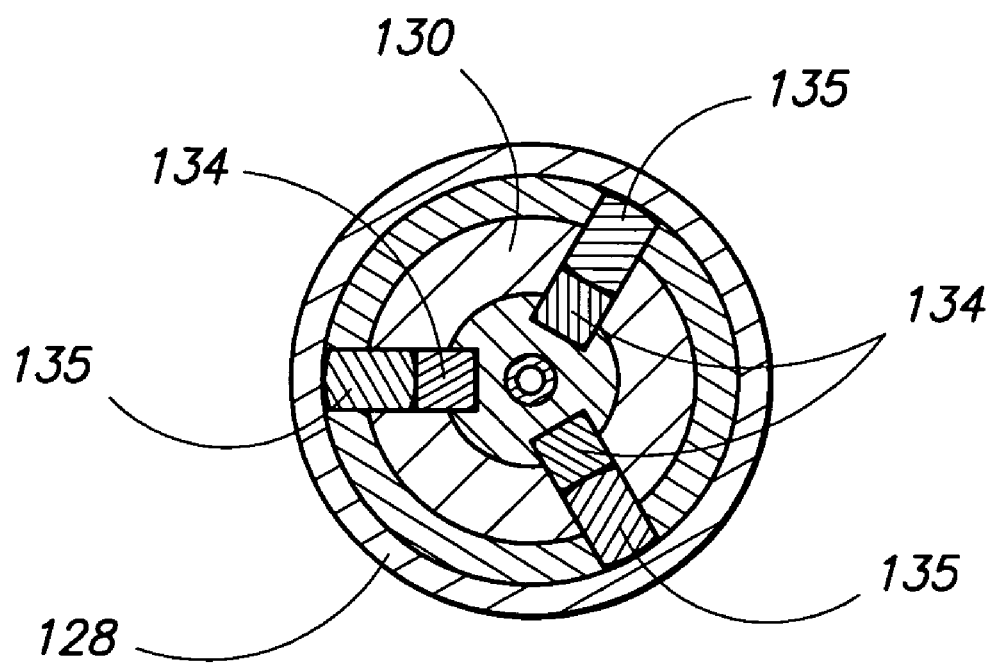

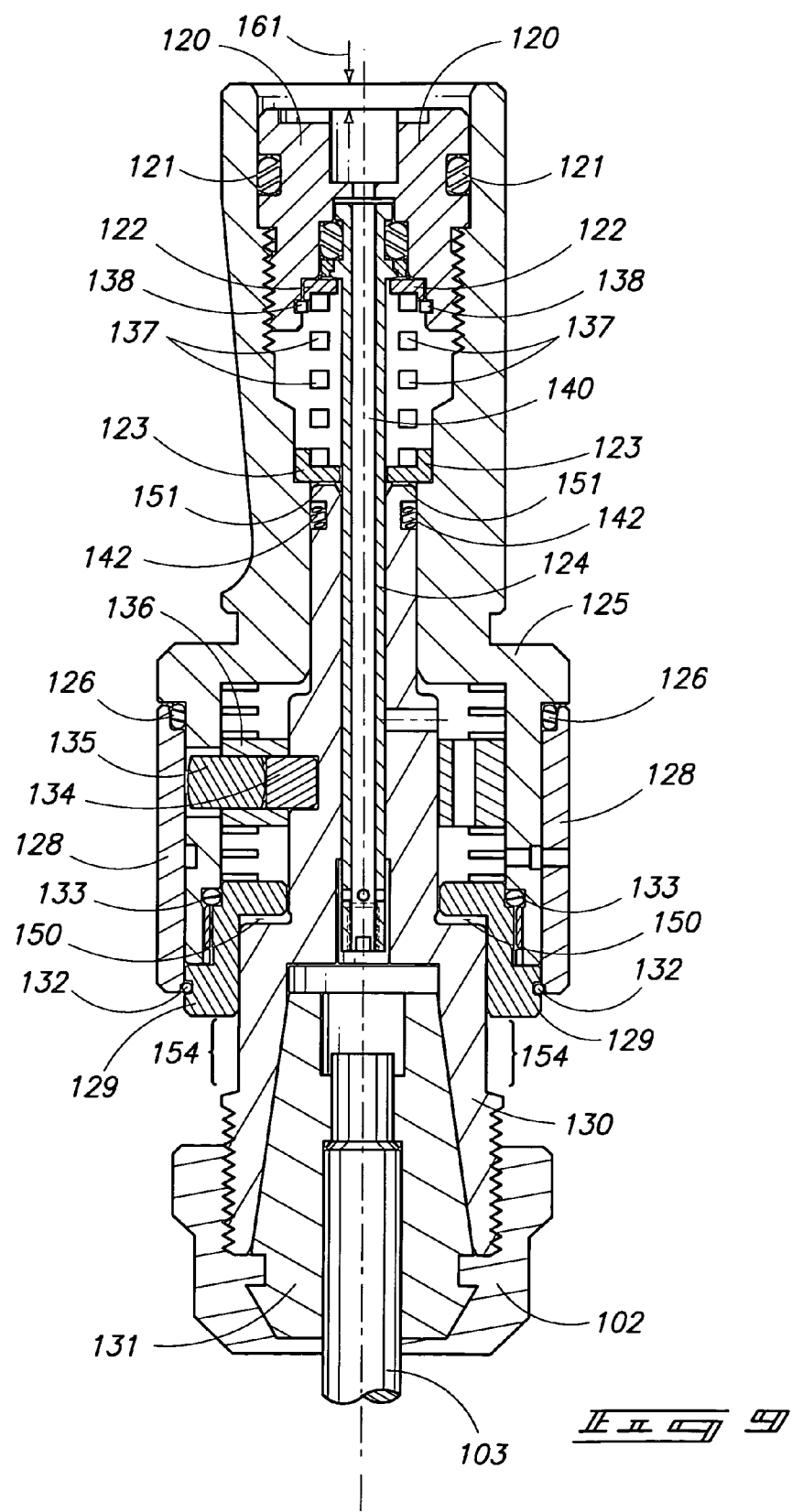

SELF-SYNCHRONIZING TAP DRIVER FOR RIGID TAPPING WITH STARTING FORCE ADJUSTMENT

TECHNICAL FIELD

This invention pertains to a self-synchronizing and self-adjusting tap driver for rigid tapping, which may include a starting force adjustment.

BACKGROUND OF THE INVENTION

In machining metallic work pieces, an apparatus called a tap is used to create internally threaded holes for receiving screws in the metallic work pieces. The tap itself is a tool with external cutting threads. In order to create the internally threaded hole in the work piece, the tap is rotated and driven into the work piece to the desired hole depth, and then reverse rotated and retracted from the work piece.

The tap is held by a tap driver, and the tap driver is held or secured within a machine which provides the forward and reverse rotation as well as the forward and reverse drive.

In creating the internally threaded hole, the tap driver is first rotated and driven into the base material or metal to the desired depth. Once the tap reaches the desired depth, the rotation of the tap driver and the tap is reversed and the tap is retracted from the base material.

In order to create the best internally threaded hole, the tap should be simultaneously advanced and rotated at precisely correlated rates of rotation and forward movement for a given tap pitch. By way of example, a one-quarter-twenty tap should be advanced into the work piece one inch for every twenty revolutions, or 0.05 inch for each revolution. In typical rigid tapping, the driver machines provide the synchronization of the spindle rotation and feed advance to match the tap pitch.

During the creation of a tap hole, the machine spindle goes through several stages, namely driving the rotating tap into the tap hole, slowing the forward drive or feed rate and the rotation until the tap comes to a stop in the work piece, reversing the direction of the rotation and accelerating or increasing the reverse rate of rotation to match the desired tap pitch as the tap is retracted.

It is appreciated by those of ordinary skill in the art that during the changes in rotation speed, the feed advance of the tap must be adjusted or correlated to precisely match the tap pitch. However, in practice it is very difficult to precisely match the rotation, drive and tap pitch and there are small errors that occur in the synchronization of the rotation speed and the feed rate during the deceleration or slowing down phase, and during the reverse rotation acceleration phase.

In typical prior art, tapping drivers are generally solid in that they have no real ability to compensate for discrepancies between the feed of the tap and the feed advance of the machine, but instead merely directly transfer the rotation and drive of the tapping machine.

With solid tap holders, even very small errors in the synchronization will apply a significant axial force on the tap, creating premature wear to the tap and negatively affecting the thread quality produced by the tap.

In machining numerous internally threaded apertures, one machine may be used to drill pilot holes into which the taps are driven, while a different machine may be used for the actual tapping. This may lead to slight positioning errors wherein the tap for instance is not exactly aligned with the pilot hole, but instead may be one or two thousandths of an inch off.

It will be appreciated by those of ordinary skill in the art that there is a need for a tap driver which has some limited flexure for the location errors associated with locating the tap with respect to the desired tap hole location.

BRIEF DESCRIPTION OF THE DRAWINGS

Preferred embodiments of the invention are described below with reference to the accompanying drawings, which are briefly described below:

FIG. 1 is an elevation view of an embodiment of this invention showing a tap driver with a tap device therein;

FIG. 2 is an elevation cross-sectional view of an embodiment of this invention showing a tap driver with a flexible area machined with helical coils between the shank portion and the chuck portion;

FIG. 4 is an elevation view of an embodiment of this invention, showing a tap driver with a tap device therein;

FIG. 5 is an elevation cross sectional view of an embodiment of this invention, showing a tap driver compensating in an impression direction;

FIG. 6 is an elevation cross sectional view of the embodiment of the tap holder illustrating FIG. 5;

FIG. 7 is an elevation cross sectional view of the embodiment of the tap driver illustrated in FIG. 5, only FIG. 7 shows the tap holder or the tap driver in to be compensating in the extension direction;

FIG. 8 is section B-B from FIG. 5, and illustrates the roller pin and drive pin configuration from a top view; and FIG. 9 is a cross sectional elevation view of the tap driver illustrated in FIG. 5.

DETAILED DESCRIPTION OF THE PREFERRED EMBODIMENTS

Figure 3:
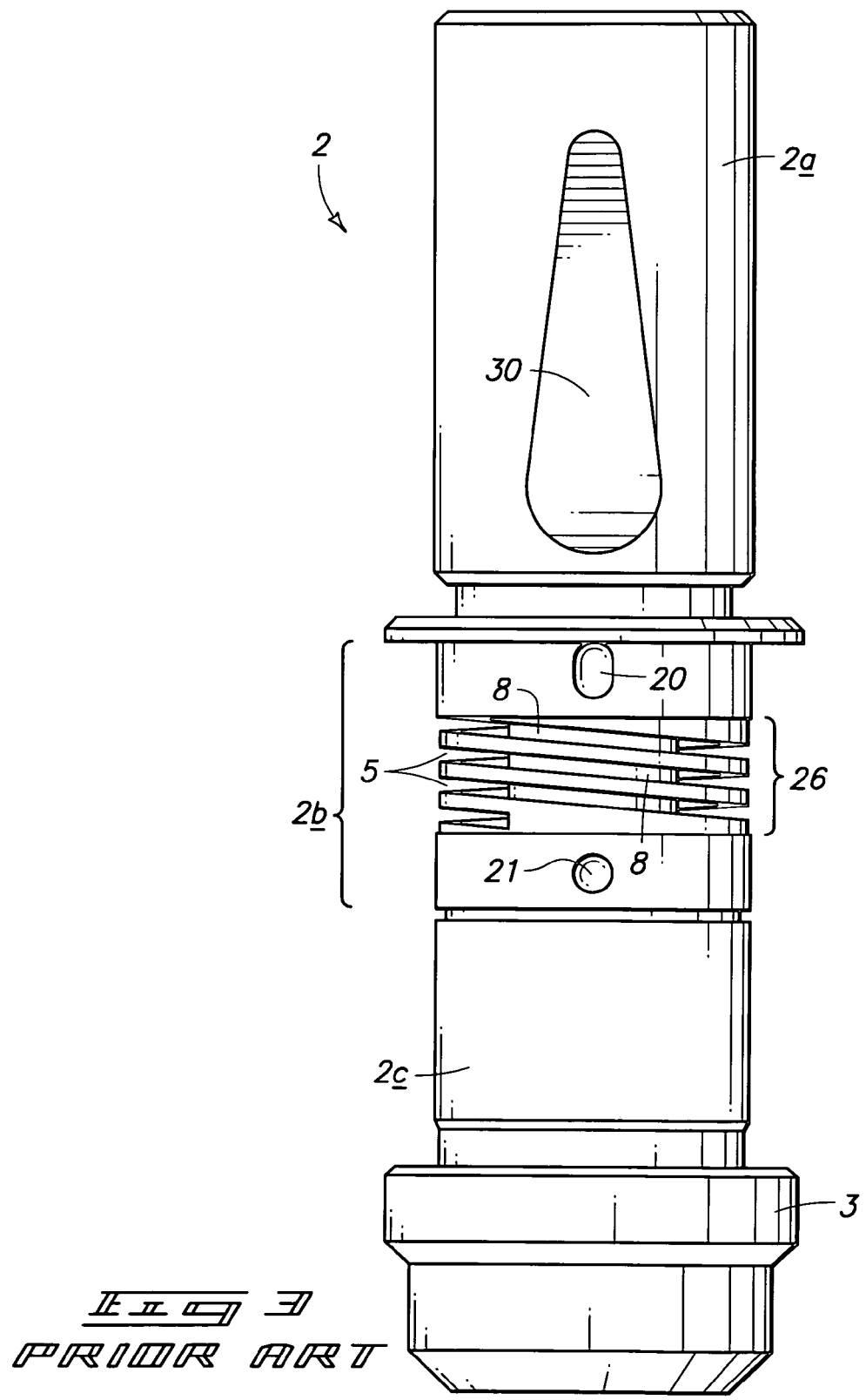
FIG. 3 is an elevation view of a tap driver body which may be used in an embodiment of this invention.

Many of the fastening, connection, manufacturing and other means and components utilized in this invention are widely known and used in the field of the invention described, and their exact nature or type is not necessary for an understanding and use of the invention by a person skilled in the art or science; therefore, they will not be discussed in significant detail. Furthermore, the various components shown or described herein for any specific application of this invention can be varied or altered as anticipated by this invention and the practice of a specific application or embodiment of any element may already be widely known or used in the art or by persons skilled in the art or science; therefore, each will not be discussed in significant detail.

The terms "a", "an", and "the" as used in the claims herein are used in conformance with long-standing claim drafting practice and not in a limiting way. Unless specifically set forth herein, the terms "a", "an", and "the" are not limited to one of such elements, but instead mean "at least one".

An example of a self-synchronizing tap driver for ridged tapping is illustrated and disclosed in U.S. Pat. No. 6,348,003 issued Feb. 19, 2002, to a common assignee of this application, Tapmatic Corporation, with the same inventors, namely Allan S. Johnson and Mark F. Johnson. U.S. Pat. No. 6,348,003 is hereby incorporated by this reference as though fully set forth herein.

It will also be appreciated by those of ordinary skill in the art that to provide such a tap holder that with force it takes to compress the spindle holding the tap can be increased, thereby improving the ability to start larger taps into a tap hold and for more difficult materials. This invention provides and adjustable tap starting force for use with self-synchronizing tap drivers, as explained more fully below.

The tap driver provided by this invention may be used in combination with any one of a different machines or applications, with no one in particular being required to practice this invention. It may be used for instance in combination with a machining center which has rigid tapping capability.

FIG. 1 is an elevation view of an embodiment of this invention showing a tap driver attachment with a tap device therein, illustrating tapping attachment 1, tap driver body 2, shank portion 2a of tap driver body 2, chuck portion 2c of tap driver body 2, tap 40, collet nut 3, tap body sleeve 4, and shank flat 30 to attach to a machine spindle or into another shank which fits into a machine spindle. The shank flat 30 facilitates the securement of the tap driver to its source of rotation or ultimately to the machine spindle.

FIG. 2 is a cross-sectional elevation view of an embodiment of this invention which shows the tapping attachment 1, tap driver body 2, with tap driver body shank portion 2a, tap driver body central portion 2b, and tap driver body chuck section 2c. In the central portion 2b of the tap driver body 2, helical coils 5 have been cut into the body around the circumference to provide a spring or tension and compression properties (and limited lateral flexure) different or dissimilar from that in the shank portion 2a and chuck portion 2c.

The helical coils can be precisely cut to provide the desired flexure, tension and compression necessary to allow the attachment body to self synchronize to forces imparted on the tap during tapping. Compression occurs by an upward force on the guide bushing 8 contained within tap driver body axial aperture 11. When an excess force is incurred, it will be transmitted through guide bushing 8 to first drive pin 6. First drive pin 6 then imparts or transfers said axial force to the helical coils 5 in central portion 2b to cause compression of the central portion 2b of the tap driver body 2.

Compression gaps 17 provide space for, and limit, the movement of guide bushing 8 during compression of center portion 2b. Compression gaps 17 are shown larger than they actually would be for illustrative purposes only. In a typical tapping attachment, the compression gaps may only need to be one-half (½) of a millimeter in order to provide the sufficient movement for the desired synchronization.

The helical coils 5 may be cut into tap driver body 2 accurately and precisely to create the desired spring characteristics to equate the central portion 2b of tap driver body 2 to a thirty pound spring. The helical coils 5 may be machined into the central body portion by Helical Products, Inc. The extension and compression rate is approximately eleven hundred sixty seven (1167) pounds per inch reference, the spring extension and compression of thirty one-thousandths inch maximum with a reaction force of thirty five pounds, plus or minus ten percent. The preferred permitted lateral translation of spring is three one-thousandths of an inch. The preferred material out of which the spring and/or tap driver body is constructed, is generally known as C300 metal.

One embodiment of this tapping attachment is able to provide some slight lateral movement of the tap to the hole while still providing a sufficiently accurate tap hole. The preferred embodiment of the invention, through the helical groove portion, provides approximately two one-thousandths ($2/1000$) of an inch of movement side to side at the end of the tap to allow for slight mis-alignment of the tap with the hole.

In a typical tapping application, the helical grooved area may provide for axial movement of up to thirty-one thousandths ($31/1000$) of an inch, even though the typical axial movement will only be in the two-one thousandths ($2/1000$) of an inch to five-one thousandths ($5/1000$) of an inch range. It is preferred that there be approximately thirty-one thousandths ($31/1000$) of an inch movement in response to approximately thirty (30) pounds of axial force, although the predetermined movement may be in response to any range of predetermined forces, all within the contemplation of this invention.

Although there are embodiments of this invention in which are not one piece or integral, it is preferred that the compression/tension area be integral or one piece with the tap driver body for concentricity and other reasons. Utilizing an embodiment of this invention wherein the tap driver body is one piece removes the reliance on the accurate assembly or fitting of two pieces together.

FIG. 2 further illustrates tap driver body axial aperture 11 through which cutting fluid or lubricant may be provided or routed for the tapping procedure. The guide bushing axial aperture 8 further provides the necessary conduit for the coolant to reach the collet chuck 12 and be provided to the tap hole during tapping, in accordance with known means by those of ordinary skill in the industry.

FIG. 2 further illustrates second drive pin 9 spaced apart from tap driver body 2 at least a distance equal to compression gap 17 to allow its movement. The first end 9a of second drive pin 9 is in the at least one drive pin aperture in the outer surface of the guide bushing 8 and a second end 9b of second drive pin 9 fits within aperture 20, which is better shown in FIG. 3 and is preferably oval shaped. Ball bearings 7 are provided in gaps above and below the helical coils 5 to maintain the first drive pin 6 and the second drive pin 9 in their respective locations, while still allowing relative axial and lateral movement. The first end 6a of first drive pin 6 is in the at least one drive pin aperture in the outer surface of the guide bushing 8 and a second end 6b of first drive pin 6 is in the at least one drive pin aperture 21 (better shown in FIG. 3) in the inner surface of the tap driver body 2.

O-rings 16 are shown between guide bushing 8 and tap driver body 2, the O-rings 16 providing a seal for containment and control of coolant injected into tap driver body axial aperture 11.

The tapping attachment further includes tap body sleeve 4 which generally surrounds the central portion 2b of tap driver body 2. FIG. 2 further shows collet nut 3 around the chuck portion 2c of tap driver body 2 for securing the tap into the chuck collet area 12. Also shown in FIG. 2 is shank flat 30 in the shank portion 2a of tap driver body 2, and tap 40. FIG. 2 further shows sealing ring 33 and tap square 34.

The term central portion as used herein in reference to the tap driver body is meant to include any area or portion of the tapping attachment between where the tap driver is held by the tapping machine, and where the tap is held by the tap driver.

FIG. 3 is an elevation view of the tap driver body 2, illustrating the shank portion 2a, central portion 2b and chuck portion 2c. Helical coils 5 are shown cut into central portion 2b and surrounded by first drive pin aperture 21 and second drive pin aperture 20. It will be noted that first drive pin aperture 21 provides a tight fit for first drive pin 6 to provide little or no relative movement between first drive pin 6 and tap driver body 2. On the other hand, second drive pin aperture 20 is intentionally larger than second drive pin 9 to allow for some relative movement, as is more fully illustrated in FIG. 2. Collet nut 3 is also shown around the chuck portion 2c of tap driver body 2.

FIG. 4 is an elevation view of an embodiment of this invention, showing a tap driver with a tap device therein, illustrating tap driver 101, tap 103, collet nut 102, drive spindle 104, cover sleeve 128, central body portion 105, roller pin 135 in aperture 106 in housing (shown and more fully described in other figures).

FIG. 5 illustrates an embodiment of a tap driver in the neutral position. FIG. 5 shows tap driver 100, tap start adjustment nut 120, O-ring 121, upper spring washer 122, retaining ring 138, tap start adjustment spring 137, lower spring washer 123, O-ring 142, coolant tube 124, housing 125, sleeveO-ring 126, spirawave springs 127, with upper spirawave spring 127a and lower spirawave spring 127b. FIG. 5 further illustrates cover sleeve 128, lock nut 129, drive spindle 130, collet nut 102 or holding tap 103, collet 131, sleeve retaining ring 132, lock nutO-ring 133, drive pin 134, roller pin 135, driver coupling 136, tap start adjustment spring 137, and retaining ring 138.

Again, FIG. 5 shows the tap holder in the neutral position and in the neutral position there is essentially no gap 151 (or a gap of less than approximately 0.015 inches in a preferred embodiment) between lower spring washer and the top portion of drive spindle 130. Furthermore, lower gap 150 between drive spindle 130 shoulder and lock nut 129 is an intermediate gap distance when compared to later figures.

FIG. 6 is an elevation cross sectional view of the embodiment of the tap holder illustrating FIG. 5, as contemplated by this invention, and wherein the tap holder is shown compensating in the compression direction due to forces incurred during tapping procedure. The items illustrated in FIG. 6 are similarly numbered as those in FIG. 5 and each will not be repeated herein.

In this configuration wherein the tap holder is compensating in the compression direction the tap start adjustment spring 137 is compressed, the upper spirawave spring 127a is compressed and the drive spindle 130 can also be compressed, up to approximately 0.030 inches. The compression of the drive spindle may occur to compensate the discrepancy between the machine synchronization and the tap pitch.

It will be noted that lower gap 150 is essentially no gap in this compensating configuration, upper gap 151 is slight, but more than in a neutral position and the tap start adjustment springs 137 are in a more compressed configuration than when in the neutral position illustrated in FIG. 5.

It will be appreciated by those of ordinary skill in the art that the spring configuration with the upper spring 127a and the lower spring 127b, that the upper spring 127a may be used primarily for compensating for compressive forces, and lower spring 127b may be used primarily for compensating for extension forces.

FIG. 7 is an elevation cross sectional view of the embodiment of the tap driver illustrated in FIG. 5, only FIG. 7 shows the tap holder or the tap driver in to be compensating in the extension direction. In this configuration or mode, upper gap 151 is open as shown, lower spirawave spring 127b is further compressed and lower gap 150 is greatest. In this configuration wherein the tap holder is compensating the direction extension, the drive spindle 130 maybe extended up to approximately 0.030 inches to compensate for discrepancies between the machine synchronization and the tap pitch.

It will be noted that distance 154 in FIG. 7 will vary from distance 154 in FIGS. 5 and 6 due to the relative movements of the components discussed relative to the gaps in other movements. It will be further appreciated by those of ordinary skill in the art that with respect to FIG. 4, the torque is transmitted from the housing to the drive pins 134 and then from the drive pins 134 to the drive spindle holding tap. The pins can be set to ranges to limit the movement, and in this preferred embodiment, those movements are limited to 0.03 inches in the compression and extension direction. However it will appreciated by those of ordinary skill in the art that no particular limits are required to practice this invention, but any one of a number of different ranges or parameters within a range may be selected, all within a contemplation of this invention.

In the example of FIG. 7, it will be appreciated by those of ordinary skill in the art how when the system is compensating in the extension direction, the lower spirawave spring 127b is compressed and distance 150 is in an extended position as shown. It will be noted that the distances shown in all the figures are for illustrative purposes only, and not drawn to scale. Distance 151 is also shown in an expanded or extended position.

FIG. 8 is section B-B from FIG. 5, and illustrates the roller pin and drive pin configuration from a top view. It will be noted by those of ordinary skill in the art that while three drive pins and roller pins are shown in FIG. 8, any one of a number of different such pins may be utilized in different embodiments of this invention, with no one in particular being required to practice the invention.

FIG. 8 illustrates roller pins 135, drive pins 134, cover sleeve 128, and drive spindle 130.

FIG. 9 is a cross sectional elevation view of the tap driver illustrated in FIG. 5, and shows the adjustment nut 120 tightened down approximately 0.080 inches to compress the tap start adjustment spring. The compression of the tap start adjustment spring 137 increases the force on the tap and helps in the initiation or starting of larger taps into a target tap hole. It also helps a tap to start or initiate rotation in more difficult materials to machine. It will be noted by those of ordinary skill in the art that there is a slight upper gap 151, a more neutral gap 150 and distance 154 between lock nut 129 and the top of threads on drive spindle 130.

It will also be appreciated by those of ordinary skill in the art that any one of a number of different means can be utilized to adjust the force on the tap start adjustment spring 137, such as by making the adjustment nut 120 an externally threaded nut and placing internal threads within housing 125. One could also have a pin and slot combination such that the adjustment nut 120 has a slot in which a pin slides to one of multiple horizontal locations, each of which represents a different start tension with adjustment nut moving distance 161 for instance from an alternative start point, all within the contemplation of embodiments of this invention.

It will also be appreciated by those of ordinary skill in the art that adding to the compression force before or at the initiation of tapping will reduce the amount of flexure the tap will make, which will make it easier to initiate tapping on harder materials or larger tap holes which may place more force on the tap to initiate or continue the tapping process. An adjustment or pre-start imposition of an additional force on the tap start adjustment spring 137 through the adjustment nut 120, may for instance add an additional ten to twenty pounds of force on the tap start adjustment spring 137, and on the upper spirawave spring 127a, which provides the adjusted tap start parameters desired.

It will be appreciated by those of ordinary skill in the art that within the contemplation of this invention, there are any one of a number of different types of springs that may be utilized for the upper spring 127a and the lower spring 127b, with a spirawave type of spring being preferred, but with others available as design choices.

As will be appreciated by those of reasonable skill in the art, there are numerous embodiments to this invention, and variations of elements and components which may be used, all within the scope of this invention.

In one embodiment for example a tap driver for rigid tapping may be provided, which comprises: (a) a tap driver body comprising: a shank portion at a first end of the tap driver body, the shank portion configured to be secured to a tapping machine; a chuck portion at a second end of the tap driver; and a central body portion between the shank portion and the chuck portion, the central body portion having a predetermined and adjustable axial compressibility in response to forces imparted on the tap driver during tapping.

In another embodiment, a tap driver for rigid tapping may be provided which comprises: (a) a tap driver body comprising: a shank portion at a first end of the tap driver body, the shank portion configured to be secured to a tapping machine; a chuck portion at a second end of the tap driver; a central body portion between the shank portion and the chuck portion, the central body portion having a predetermined axial compressibility in response to forces imparted on the tap driver during tapping; and a tap start force adjustment device which imparts an adjustable force on the tap.

In further embodiments from that recited in the preceding paragraph, the tap driver may be further provided: wherein the central body portion further comprises an upper spring and a lower spring, wherein at least one of the upper spring and the lower spring provides axial compressibility; wherein one of the upper spring and the lower spring provides axial compressibility for compensating for compression of the tap driver; wherein one of the upper spring and the lower spring provides axial compressibility for compensating for extension of the tap driver; and/or further wherein the upper spring has an axial compressibility different than the lower spring axial compressibility.

In another embodiment, a tap driver for rigid tapping may be provided, which comprises: a tap driver body comprising: a shank portion at a first end of the tap driver body, the shank portion configured to be secured to a tapping machine; a chuck portion at a second end of the tap driver; a central body portion between the shank portion and the chuck portion, the central body portion having a predetermined axial compressibility in response to forces imparted on the tap driver during tapping; and a pre-start axial compressor which imparts an adjustable force on the central body portion to adjust the predetermined axial compressibility.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A tap driver for rigid or synchronous tapping, comprising:
   (a) a tap driver body comprising:
      (i) a shank portion at a first end of the tap driver body, the shank portion configured to be secured to a tapping machine;
      (ii) a chuck portion at a second end of the tap driver;
      (iii) a central body portion between the shank portion and the chuck portion such that the shank portion, the chuck portion and the central body portion form the tap driver body, the central body portion having a predetermined axial compressibility contained in the central body itself and wherein said axial compressibility is adjustable by pre-imposing compression to the central body portion to achieve a desired response to forces imparted on the tap driver during tapping.

2. A tap driver for rigid or synchronous tapping, comprising:
   (a) A tap driver body comprising:
      (i) a shank portion at a first end of the tap driver body, the shank portion configured to be secured to a tapping machine;
      (ii) a chuck portion at a second end of the tap driver;
      (iii) a central body portion between the shank portion and the chuck portion, such that the shank portion, the chuck portion and the central body portion form the tap driver body, the central body portion having a predetermined axial compressibility in response to forces imparted on the tap driver during tapping; and
      (iv) a tap start force adjustment device which imparts an adjustable force on the tap.

3. A tap driver for rigid tapping as recited in claim 2, and wherein the central body portion further comprises an upper spring and a lower spring, wherein at least one of the upper spring and the lower spring provides axial compressibility.

4. A tap driver for rigid tapping as recited in claim 3, and wherein one of the upper spring and the lower spring provides axial compressibility for compensating for compression of the tap driver.

5. A tap driver for rigid tapping as recited in claim 3, and wherein one of the upper spring and the lower spring provides axial compressibility for compensating for extension of the tap driver.

6. A tap driver for rigid tapping as recited in claim 3, and wherein the upper spring has an axial compressibility different than the lower spring axial compressibility.

7. A tap driver for rigid or synchronous tapping, comprising:
   (a) a tap driver body comprising:
      (i) a shank portion at a first end of the tap driver body, the shank portion configured to be secured to a tapping machine;
      (ii) a chuck portion at a second end of the tap driver;
      (iii) a central body portion between the shank portion and the chuck portion such that the shank portion, the chuck portion and the central body portion form the tap driver body, the central body portion having a predetermined axial compressibility in response to forces imparted on the tap driver during tapping; and
      (iv) a pre-start axial compressor which imparts an adjustable force on the central body portion to adjust the predetermined axial compressibility.

8. A tap driver for rigid or synchronous tapping, comprising:
   (a) a tap driver body comprising:
      (i) a shank portion at a first end of the tap driver body, the shank portion configured to be secured to a tapping machine;
      (ii) a chuck portion at a second end of the tap driver;
      (iii) a central body portion between the shank portion and the chuck portion, such that the shank portion, the chuck portion and the central body portion form the tap driver body, the central body portion having a predetermined axial compressibility in response to forces imparted on the tap driver during tapping; and
      (iv) an adjustment means to adjust the predetermined axial compressibility of the central body portion.

9. A tap driver as recited in claim 5, and further one of the upper spring and the lower spring provides axial compressibility for compensating for compression of the tap driver.

10. A tap driver for rigid tapping as recited in claim 3, and wherein the upper spring and the lower spring are around the perimeter of the central body portion such that one of the upper spring and the lower spring provides axial compressibility for providing lateral flexure of the tap in response to lateral forces.

\* \* \* \* \*